Oct. 21, 1930.  E. REYNOLDS  1,778,773
WEED CUTTER
Filed June 26, 1928
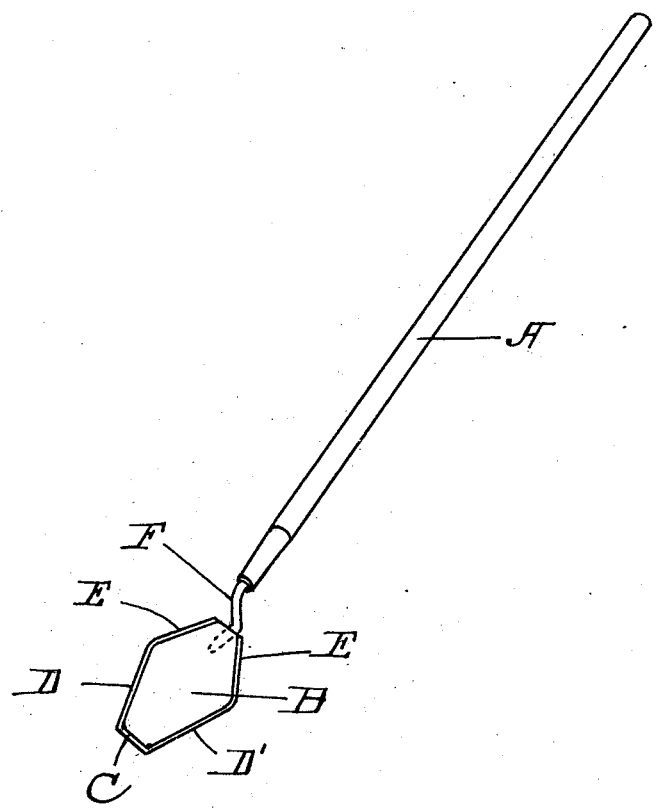
INVENTOR.
Edward Reynolds.
BY Bradbury & Caswell
ATTORNEYS.

Patented Oct. 21, 1930

1,778,773

UNITED STATES PATENT OFFICE

EDWARD REYNOLDS, OF WHITTIER, CALIFORNIA

WEED CUTTER

Application filed June 26, 1928. Serial No. 288,366.

My invention relates to improvements in weed cutters of that class in which the device is used as a hand implement for cutting weeds in the garden and for trimming the edges of lawns and flower beds. The primary object is the saving of time and labor and greater effectiveness in use.

To these ends my invention comprises the features of construction and combination of parts hereinafter described and claimed.

The accompanying drawing forming part of this specification is a perspective view of my invention.

In the drawing, A indicates a handle which may be of any suitable shape or size. B is a substantially flat thin blade made of metal or other suitable material. This blade is formed with a transverse forward cutting edge C and a pair of side cutting edges D—D', which converge gradually in a forward direction. The rearward portion of the blade is formed with a pair of rearwardly converging cutting edges E—E'. This blade as described is mounted upon said handle by the supporting arm F, which resembles a reverse curve, one end being secured to said blade by welding or other suitable means and the other fastened to the handle by a socket connection or other suitable means. When thus constructed the blade projects with its forward end outwardly beyond one end of the handle so that in use a forward thrust movement of the handle causes the transverse and forwardly converging side cutting edges D—D' to cut weeds or other growth and a rearward movement causes the rearward side cutting edges E—E' to also cut weeds and growth, thus producing a garden tool which reduces labor, saves time and promotes greater effectiveness in use.

A tool of this improved character is particularly although not exclusively serviceable for cutting weeds in flower beds and gardens and for trimming the edges of grass around flower beds and lawns.

Having described my invention, what I claim as new and desire to secure by Letters Patent is:

A weed cutter, comprising, in combination, a handle and a substantially flat blade below which said handle is mounted having a substantially straight transverse forward cutting edge, a pair of forwardly converging substantially straight cutting edges joined to the ends of said forward cutting edge and a pair of rearwardly extending side cutting edges joined to the rearward ends of said converging edges, whereby weeds and growth may be more effectively cut by forward thrust and reverse movement of the blade by said handle.

In testimony whereof, I have signed my name to this specification.

EDWARD REYNOLDS.